United States Patent
West

(10) Patent No.: US 9,203,323 B2
(45) Date of Patent: Dec. 1, 2015

(54) VERY HIGH EFFICIENCY UNINTERRUPTIBLE POWER SUPPLY

(75) Inventor: Richard Travis West, Ragged Point, CA (US)

(73) Assignee: RENEWABLE POWER CONVERSION, INC., San Luis Obispo, CA (US)

( * ) Notice: Subject to any disclaimer, the term of this patent is extended or adjusted under 35 U.S.C. 154(b) by 261 days.

(21) Appl. No.: 13/240,164

(22) Filed: Sep. 22, 2011

(65) Prior Publication Data

US 2012/0025609 A1 Feb. 2, 2012

(51) Int. Cl.
- *H02J 4/00* (2006.01)
- *H02M 5/297* (2006.01)
- *H02J 9/06* (2006.01)
- *H02M 5/458* (2006.01)

(52) U.S. Cl.
CPC ............ *H02M 5/297* (2013.01); *H02J 9/062* (2013.01); *H02M 5/4585* (2013.01); *H02J 2009/063* (2013.01); *Y10T 307/406* (2015.04); *Y10T 307/549* (2015.04); *Y10T 307/696* (2015.04)

(58) Field of Classification Search
USPC ................................ 363/108–109; 307/31, 66
See application file for complete search history.

(56) References Cited

U.S. PATENT DOCUMENTS

| | | | | |
|---|---|---|---|---|
| 4,663,569 A * | 5/1987 | Alley et al. | | 315/175 |
| 4,763,013 A * | 8/1988 | Gvoth et al. | | 307/66 |
| 5,134,307 A * | 7/1992 | Nakano | | 307/87 |
| 5,198,970 A * | 3/1993 | Kawabata et al. | | 363/37 |
| 5,253,157 A * | 10/1993 | Severinsky | | 363/98 |
| 5,654,591 A | 8/1997 | Mabboux et al. | | |
| 5,991,169 A * | 11/1999 | Kooken | | 363/17 |
| 6,185,111 B1 * | 2/2001 | Yoshida | | 363/17 |
| 6,380,719 B2 * | 4/2002 | Underwood et al. | | 322/36 |
| 6,388,897 B1 * | 5/2002 | Ying et al. | | 363/17 |
| 6,437,996 B1 * | 8/2002 | Wobben | | 363/37 |
| 6,744,239 B2 * | 6/2004 | Fukushima et al. | | 322/8 |
| 7,053,504 B2 * | 5/2006 | Ketteler | | 307/72 |
| 7,105,948 B2 * | 9/2006 | Steimer | | 307/46 |
| 7,495,937 B2 * | 2/2009 | Hara et al. | | 363/37 |
| 7,508,094 B2 * | 3/2009 | Johnson et al. | | 307/64 |
| 7,800,924 B2 | 9/2010 | Oughton, Jr. et al. | | |
| 7,843,714 B2 | 11/2010 | Bremicker et al. | | |
| 7,990,097 B2 * | 8/2011 | Cheng et al. | | 318/800 |
| 2002/0067929 A1 * | 6/2002 | James et al. | | 307/38 |
| 2007/0216228 A1 * | 9/2007 | Johnson et al. | | 307/64 |
| 2007/0246943 A1 * | 10/2007 | Chang et al. | | 290/44 |
| 2009/0184583 A1 * | 7/2009 | Lu et al. | | 307/66 |
| 2009/0278405 A1 * | 11/2009 | Stancu et al. | | 307/10.1 |
| 2012/0032651 A1 * | 2/2012 | Torrico-Bascop | | 323/209 |

* cited by examiner

Primary Examiner — Fritz M Fleming

(57) ABSTRACT

The invention is an electrical power conversion topology. The preferred embodiment is as a three-phase, on-line Uninterruptible Power Supply (UPS). The desired AC output voltage waveform is formed on each output line or phase of the UPS, using pulse modulation techniques and a smoothing output filter inductor. A semiconductor switching matrix is used to switch the power converter side of each output filter inductor between three voltage potentials, a positive battery potential, a negative battery potential and a third intermediate and varying AC potential synchronized with the desired output voltage. The invention potentially provides the same performance as that of a multi-level inverter topology approaching an infinite number of DC levels.

9 Claims, 3 Drawing Sheets

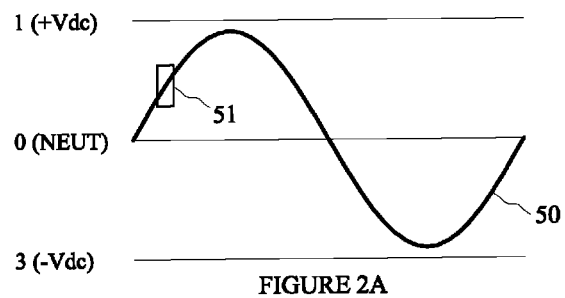
FIGURE 2A
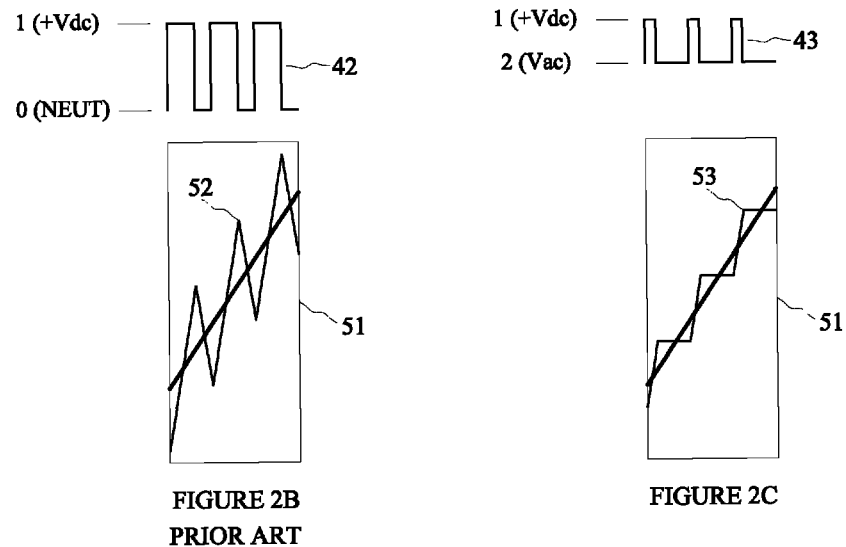
FIGURE 2B
PRIOR ART
FIGURE 2C

VERY HIGH EFFICIENCY UNINTERRUPTIBLE POWER SUPPLY

BACKGROUND OF THE INVENTION

As the power conversion industry matures and the cost of energy increases, manufacturers of uninterruptible power supplies (UPS), renewable energy power converters and motor drives have been challenged by market demands to provide products with higher conversion efficiencies, higher reliability and lower cost per kilowatt. Thirty years ago many large commercial power converters were based on low frequency SCR (silicon controlled rectifier) and thyristor based topologies. These were replaced by 2-level, half-bridge, higher frequency, pulse modulated IGBT (insulated gate bipolar transistor) based topologies. In the last few years, the industry has seen the emergence of 3-level neutral point clamp, and higher level IGBT based topologies previously used only in high power, medium-voltage applications. The invention potentially approaches the same performance as that of a multi-level inverter topology with an infinite number of DC levels. When compared to all prior art power conversion topologies in on-line UPS applications, the invention provides higher conversion efficiencies, higher reliability and lower cost.

BRIEF SUMMARY OF THE INVENTION

The invention is an electrical power conversion topology or a power converter based on the disclosed power converter topology. The preferred embodiment is as a three-phase, on-line Uninterruptible Power Supply (UPS). The desired AC output voltage waveform is created on each output line or phase of the UPS, using pulse modulation techniques and a smoothing output filter inductor. A semiconductor switching matrix is used to switch the power converter side of each output filter inductor between three voltage potentials, a positive battery potential, a negative battery potential and a third intermediate and varying AC potential synchronized with the desired output voltage. Under most load conditions, this third, varying AC potential is only connected during what would be the inductor freewheel period when using prior art topologies. As such, the stored inductor energy is substantially constant during the portion of a PWM (pulse width modulated) cycle when energy is not being sourced from either battery and through the inductor to any load. This varying AC potential need not be an exact match with the desired output voltage to significantly reduce the "idle" voltage across the inductor. If, however, this AC potential and the AC output are at the same instantaneous voltage, then the inductor voltage will be effectively be clamped at zero and the inductor di/dt will be zero. Current will still be delivered to support the load during this zero-inductor-voltage period but will be sourced directly from the utility grid, pre-rectifier. A close voltage match for a 480Vac in and 480Vac out on-line UPS or power conditioner is the normal condition when primary power is available. The invention potentially provides the same performance as that of a multi-level inverter topology approaching an infinite number of DC levels. In addition, when using the invention in a typical on-line UPS, comprising a 3-phase rectifier, batteries and a 3-phase buck converter, the power processed by the rectifier is reduced by more than half for buck converter modulation indices less than ½ since load power is sourced directly from the utility source, for sub-switching-cycle periods as in an off-line UPS but with the input power factor correction, the power quality and seamless transfer of an on-line UPS.

UTILITY OF THE INVENTION

The best utility of the invention is found in on-line uninterruptible power supplies (UPS) used in data centers, banks, hospitals, air traffic control and other applications where power availability and quality are critical. The current global market for UPS systems is $7.2B and is projected to reach $10B by 2015. It is estimated that a 1 MW high-availability data center can consume $20,000,000,of electricity over its lifetime. Currently on-line UPS systems have input rectifier and output bridge power conversion efficiencies of 96% (each) or total throughput efficiencies of 92%. This equates to $1,600,000 of electricity lost in power conversion waste heat over the life of one 1 MW system. A UPS system based on the invention would have less than half the power conversion losses of the highest performance state-of-the-art machines now on the market and would also have significant reductions in cost, weight, size and installation site heat removal requirements.

BRIEF DESCRIPTION OF THE DRAWINGS

FIG. 2—Illustrates the relative performance of a prior art, 3-level DC-to-AC power converter switching between three DC levels and a DC-to-AC power converter based on the invention, switching between two DC levels and an AC potential.

DETAILED DESCRIPTION OF THE INVENTION

Figure 1:
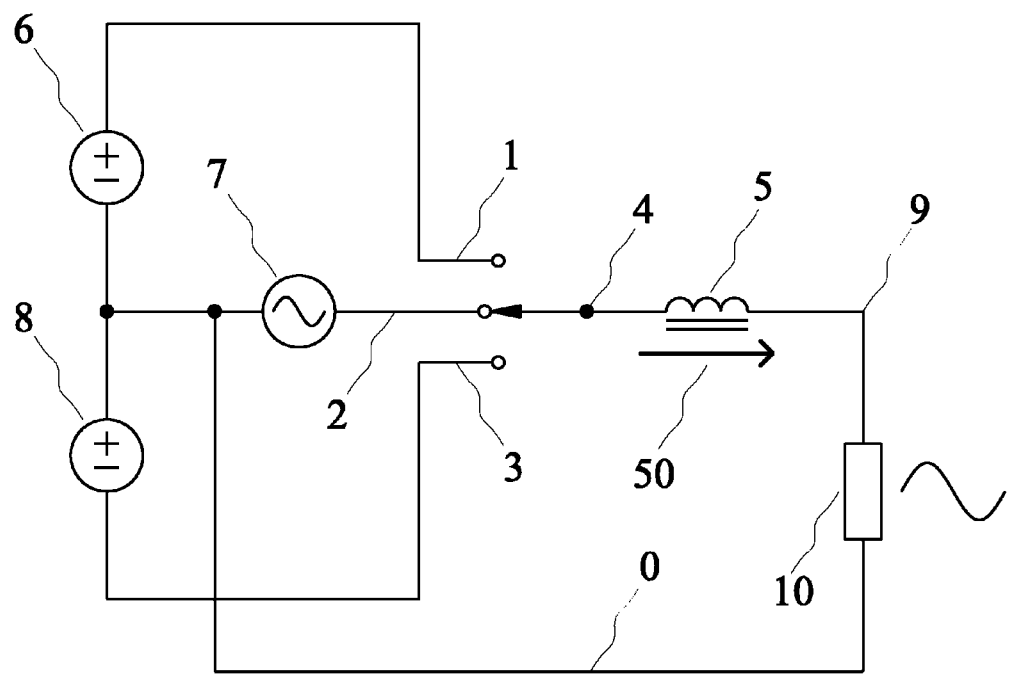
FIG. 1—Is an electrical schematic which illustrates the invention in its simplest possible form.

FIG. 1 is an electrical schematic which illustrates the invention in its simplest possible form. Positive DC source 6, AC source 7, Negative DC source 8, and load 10 are all referenced to and have a common connection to arbitrary neutral 0. Switch pole 4 and switch throws 1, 2 and 3 together form a single-pole-three-throw switch (SP3T). In practice, the SP3T switch function would be configured as a high speed semiconductor switching matrix. Sources 6, 7 and 8 connect to switch throws 1, 2 and 3, respectively. Switch pole 4 connects to the switched end of inductor 5. The load end of inductor 5 is connected to load 10 at circuit connection point 9. The inductor and therefore the load current are illustrated by arrow 50. If AC source 7 were replaced with a short circuit the topology would be a prior-art, three level neutral point clamp (3LNPC) power converter topology.

FIG. 2B illustrates the performance of a prior art, three level neutral point clamp DC-to-AC power converter switching between three DC levels. FIG. 2C illustrates the performance of a DC-to-AC power converter based on the invention and switching between two DC levels and an AC potential. FIG. 2A locates the operating point on inductor current 50 bounded by box 51 and detailed in FIGS. 2B and 2C. In FIG. 2B, waveform 42 is the pulse width modulation required to produce instantaneous inductor current 52 and average inductor current 50 using a prior art three level neutral point clamp power converter topology where, referring back to FIG. 1, source 7 is replaced by a short circuit. Waveform 42 is, referring back to FIG. 1, the voltage swing at switch pole 4, on the switched side of inductor 5, and moves between the plus DC potential at switch terminal 1 and neutral 0 (assumes AC source 7 is shorted) at switch terminal 2. In FIG. 2C, waveform 43 is the pulse width modulation required to produce instantaneous inductor current 53 and average inductor current 50 using the invention per FIG. 1. Waveform 43 is the voltage swing at switch pole 4, on the switched side of inductor 5, and moves between the plus DC potential at switch terminal 1 and switch terminal 2, the instantaneous voltage of AC source 7 in FIG. 1. At operating point 51 and assuming a load voltage half that of positive DC source voltage 6, with the invention, semiconductor switching losses are reduced by 50%, peak-to-peak ripple currents are reduced by 60% and the conduction time of the semiconductor switch matrix in position 1 is reduced by 60% compared to a prior art three-level-neutral-point-clamp topology.

Figure 3A:
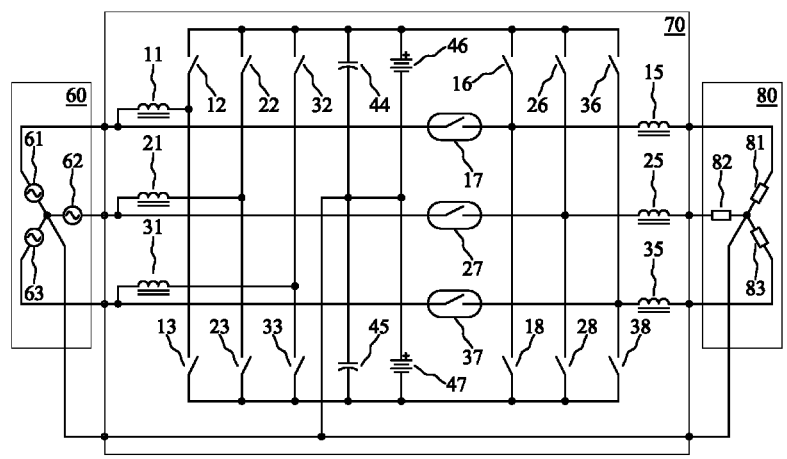
FIG. 3—Is an electrical schematic of the invention preferred embodiment as a 3-phase on-line uninterruptible power supply.
Figure 3B:
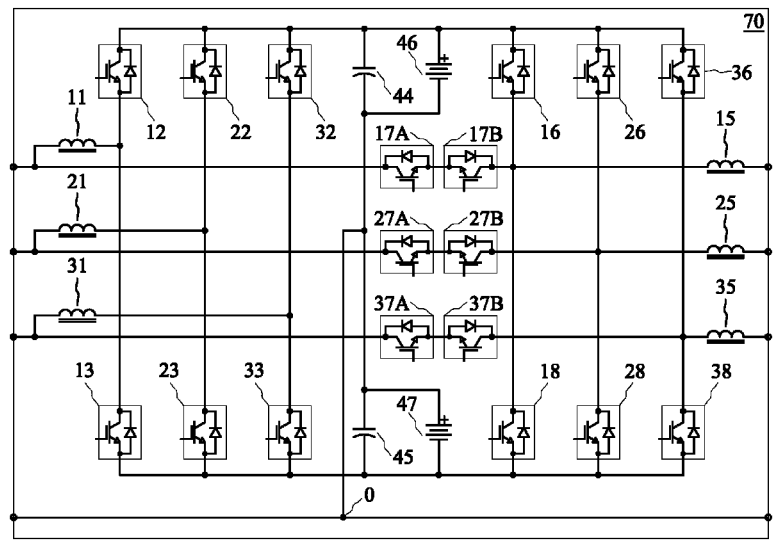

FIG. 3A is a schematic diagram for a preferred embodiment of the invention 70 as an on-line UPS (uninterruptible power supply) with the same nominal input and output voltages and using simple symbols to illustrate the machine function. Switches 12, 13, 22, 23, 32 and 33 in conjunction with inductors 11, 21 and 31 are arranged as a typical, prior art, three-phase rectifier used to convert power from utility source 60 at unity power factor to supply batteries 46 and 47 and indirectly, loads 80, as the system is battery-centric with respect to energy transfer. Batteries 46 are paralleled with capacitors 44 forming a positive DC bus and batteries 47 are paralleled with capacitors 45 forming a negative DC bus, both with respect to AC and DC neutral point 0. UPS 70 outputs are connected to loads 81, 82 and 83 in a grounded wye configuration. The voltage across each load is independently regulated. Current is delivered to load 81 through inductor 15 as a function of the relative "on" times or conduction times of semiconductor switches 16, 17 and 18. The same applies for load 82, inductor 25 and switches 26, 27 and 28 as well as load 83, inductor 35 and switches 36, 37 and 38, respectively. Each line or phase of the UPS output breaks down to the basic topology shown in FIG. 1. In FIG. 3A, there is one AC source per phase, sources 61, 62 and 63, analogous to AC source 7 in FIG. 1. Semiconductor switching elements 17, 27 and 37 are each any arrangement of semiconductor devices capable of selectively blocking voltages of either polarity. A common emitter IGBT configuration is shown by example in FIG. 3B as elements 17A and 17B. In the preferred mode of operation, switches 17, 27 and 37 will only be in conduction when inductors 15, 25 and 35 are not being sourced from batteries 46 and 47, as analogous to the inductor freewheeling portion of a PWM cycle in prior art power converters. When utility source 60 is lost, each output line or phase of UPS 70 functions as a 2-level, half-bridge topology. An additional bi-directional switch may also be used between the switched side of each inductor and neutral, so that when source 60 is lost, the UPS may function as a 3-level neutral point clamp topology. In practice, AC power capacitors will be required across source inputs 61, 62 and 63 to neutral 0, to limit voltage overshoot on switches 17, 27 and 37. If the nominal source voltages 60 and the load voltages 80 are not the same, an autotransformer or transformer may be used to facilitate a closer match.

The invention potentially provides the same performance as that of a multi-level inverter topology approaching an infinite number of DC levels. In addition, when using the invention in a typical on-line UPS, comprising a 3-phase rectifier, batteries and a 3-phase buck converter, the power processed by the rectifier is reduced by more than half, for buck converter modulation indices less than ½, since load current is sourced directly from the utility source, for sub-switching-cycle periods, as in an off-line UPS but with the input power factor correction, the power quality and the availability (seamless transfer) of an on-line UPS.

What I claim as my invention is:

1. An on-line uninterruptible power supply for supplying power to an external AC load comprising; a positive DC source, a negative DC source, an AC source, an inductor and an arrangement of semiconductor switches, wherein each of said positive DC source, said negative DC source, said AC source and said external AC load have first and second terminals, wherein the second terminal of each of said positive DC source, said negative DC source, said AC source and said external AC load are coupled to an arbitrary neutral point, wherein DC source adjectives positive and negative refer to DC voltage potentials with respect to said arbitrary neutral point and wherein said arrangement of semiconductor switches provide a means for selectively coupling the first terminal of each of said positive DC source, said negative DC source or said AC source to a first terminal of said inductor and wherein a second terminal of said inductor is coupled to first terminal of said external AC load.

2. The on-line uninterruptible power supply for supplying power to an external AC load according to claim 1 wherein said arrangement of semiconductor switches is capable high frequency pulse width modulation.

3. The on-line uninterruptible power supply for supplying power to an external AC load according to claim 1 wherein said arrangement of semiconductor switches comprises a semiconductor bi-directional AC switch, wherein said semiconductor bi-directional AC switch is a means for discriminating between the direction of current from said AC voltage source input to selectively couple either current in one direction, current with a positive sense, or the opposite direction, current with a negative sense, into said first terminal of the inductor.

4. The on-line uninterruptible power supply for supplying power to an external AC load according to claim 1 wherein; (i) selective coupling of said first terminal of positive DC source or of said first terminal of said negative DC source to said first terminal of the inductor increases or decreases the stored energy in the inductor and (ii) selective coupling said AC source to said first terminal of the inductor maintains the stored energy in the inductor.

5. The on-line uninterruptible power supply for supplying power to an external AC load according to claim 1 wherein a desired voltage is regulated across the external AC load.

6. The on-line uninterruptible power supply for supplying power to an external AC load according to claim 1 wherein said DC sources comprise energy storage batteries, capacitors or a combination of energy storage batteries and capacitors coupled in parallel.

7. The on-line uninterruptible power supply for supplying power to an external AC load according to claim 6 further comprising an input rectifier to charge said energy storage batteries from an electrical power grid.

8. The on-line uninterruptible power supply for supplying power to an external AC load according to claim 1 wherein said AC source is an electrical power grid.

9. A method of providing AC power from an uninterruptible power supply wherein said uninterruptible power supply sources power from an AC source, a positive DC source and a negative DC source to supply power to an AC load wherein the AC source, the positive DC source and the negative DC source are selectively switched at high frequencies using an arrangement of semiconductor switches and pulse or switch-mode modulation to supply an AC current through an inductor and to the AC load wherein one of said AC source, positive DC source and negative DC source may be selected to source or sink current at any instant and wherein a selection of the positive DC source is used to source a positive load current, wherein a selection of the negative DC source is used to source a negative load current and wherein a selection of the AC source is used to clamp a desired low voltage across said inductor, with any of the sources providing the AC load current for a portion of a high frequency pulse or switch-mode modulated switching cycle.

\* \* \* \* \*